United States Patent [19]

Meacham et al.

[11] Patent Number: 5,546,870
[45] Date of Patent: Aug. 20, 1996

[54] 2D AND 3D PILOT-CHANNEL ARRAYS

[76] Inventors: Patrick E. Meacham, 20298 Hunter Ct., Lakeville, Minn. 55044; Michael S. Zeilinger, 8916 72nd St., Cottage Grove, Minn. 55106; Clifford B. Meacham, 8730 E. 195th St., Prior Lake, Minn. 55372; M. Conrad Huffstutler, Jr., 280 Cole Dr., Liberty Hill, Tex. 78642

[21] Appl. No.: 134,709

[22] Filed: Oct. 12, 1993

[51] Int. Cl.⁶ ................................... B61D 49/00
[52] U.S. Cl. .................. 105/355; 104/137; 410/1; 410/54
[58] Field of Search ................. 104/134, 135, 104/137; 105/355, 392, 373, 422, 423, 455, 462, 463.1, 457; 414/537, 538; 196/182, 41; 238/10 R; 410/1, 54, 2, 52, 92, 93, 156

[56] References Cited

U.S. PATENT DOCUMENTS

| | | | |
|---|---|---|---|
| 2,355,867 | 8/1944 | Jarvis | 414/537 |
| 2,625,118 | 1/1953 | Lechner | 105/422 |
| 2,952,341 | 9/1960 | Weiler | 105/422 |
| 3,025,985 | 3/1962 | Crawford | 414/537 |
| 3,027,580 | 4/1962 | Haack | 414/537 |
| 3,232,242 | 1/1966 | Krueger | 410/1 |
| 3,687,314 | 8/1972 | Haugland | 414/537 |
| 3,757,922 | 9/1973 | Martin | 414/537 |
| 4,008,669 | 2/1977 | Sumrell | 105/422 |
| 4,091,743 | 5/1978 | Lemon | 105/422 |
| 4,109,809 | 8/1978 | Clark | 410/1 |
| 4,127,730 | 11/1978 | Melley et al. | 296/182 |
| 4,861,095 | 8/1989 | Zajic | 296/182 |
| 5,140,716 | 8/1992 | Rawdon et al. | 414/537 |
| 5,249,910 | 10/1993 | Ball | 414/538 |

FOREIGN PATENT DOCUMENTS

| | | | |
|---|---|---|---|
| 0508440 | 12/1954 | Canada | 296/182 |
| 1507636 | 9/1989 | U.S.S.R. | 296/182 |

Primary Examiner—Mark T. Le

[57] ABSTRACT

Pilot-channel arrays for guiding movements of runnered vehicles, equipment fitted with skid runners and containers with runners are provided for three-dimensional displacements such as loading and transport on trailers and for two-dimensional displacements such as movements within a storage area. Individual pilot channels incorporate specific form for safe, reliable engagement with known runner profiles to control lateral and transverse powered movements, especially loading of snowmobiles onto a trailer. Pilot-channel arrays incorporate specific placement, mounting and spacing of specific pairs of fixed or moveable channels.

5 Claims, 7 Drawing Sheets

2D AND 3D PILOT-CHANNEL ARRAYS

BACKGROUND

This invention relates to a 2D and 3D arrays of pilot channels for the support and guidance of vehicles and containers which are moveable on elongated runners.

No patents or publications can be found which disclose 2D or 3D pilot-channel arrays for runner-supported vehicles.

Snowmobiles used in long-distance competition have been fitted with sharp-edged, carbide runner blades for several years. These elements permit the machine to travel over extended patches of frozen sand/gravel without wearing through the thin metal ski. However, the sharp ends and edges "dig" into a typical wood trailer deck during sliding movements. Provided enough brute force is available to force the sled, the loading/unloading process produces deep gouges in the trailer floor and reduces its life to a few uses. An alternative solution is to lift the machine with a hoist mounted on another vehicle. The pilot-channels of this invention have been developed after careful study of the profiles of skis and carbide blades and the safety factors related to driving one or more the sleds directly into a secure position on the trailer.

SUMMARY

The pilot elements of this invention are shaped to mate with the working faces of the support runners as used on sledges, pallets, stacked containers, snowmobiles, trail-grooming equipment, etc. The basic function of the pilot-channel arrays of this invention is to guide runnered vehicles and containers for secure, compact storage. Certain sharp-edged carbide blade elements of vehicles designed for operation on ice or frozen turf are extremely destructive of the surfaces of transport trailers. Pilot-channel arrays of this invention are designed to lift the wear-resistant elements above the baseplane and to engage other non-carbide faces and edges of the runner to allow easy, controlled sliding movement under directional control. Pilot-channel arrays are prepared by fastening the selected lengths of shaped runner supports to a baseplane structure.

A 2D array of pilot channels would be used for "drive-in, drive-out" storage of snowmobiles on the floor of a display hall which would utilize sets of baseplanes with curved or angled switching segments to direct the machines from the main aisle to side branches.

An alternative 2D array of pilot channels would be used for the movement of stacked containers or pallets inside a semitrailer. Another alternative 2D array of pilot channels could be used for the movement of heavy equipment within a factory.

A 3D array of pilot channels would be used on a trailer for transporting snowmobiles with two runners; in this case there could be three baseplanes i.e., the working deck surface of a trailer, the rear or "on-loading" ramp, and the front or "off-loading" ramp, none of which are coplanar. For loading, each machine is raised to the deck level by driving up on the rear ramp and then driven off one the front ramps. The benefits of pilot channels is that expensive machines can be safely loaded into a closely-spaced group on the trailer deck under icy conditions without risk of collisions, or scratches. An additional benefit of the pilot channels of this invention is that each sled is supported against lateral displacement across the surface of an ice-coated trailer deck i.e., the machines will not slide together under turns of the trailer.

One goal of the present invention is to provide an inexpensive kit with instructions for mounting pilot channels on any size or type of snowmobile trailer to facilatate safe, secure loading and transport. Care and attention have been given to selection of pilot-channel materials which are strong, durable, and able to be extruded direct to the final shape. For some shapes, recycled polymers can be used with attendant cost savings and environmental benefits.

Another goal of the invention is to provide a shaped pilot channel to guide machines equipped with carbide-bladed runners in various types of off-ice movements i.e., sales rooms, repair shops, off-season storage halls, etc. The design intent of the silicon carbide blade element fitted to the lower surface of the runners is to cut into frozen sand or turf and to resist abrasion when running on cement or asphalt. When the machines are moved by equipment which does not lift them, serious permanent damage is inflicted upon trailer decks and building floors.

Still another goal of this invention is the development of "fixed switching zones", i.e., selected lengths of pilot channel laid out along a curved path or shorter straight lengths arranged so that the axis of each one is displaced from the preceeding one an a trailer floor.

Still another goal of this invention is the development of "articulated switching zones" wherein a selected length of pilot channel is attached to a base which is moveable and/or pivotable about a fixed axis. A moveable element could be mounted on wheels or casters or on a fork lift or loader. A pivotable element would be one with a fixed pivot axis relative to the floor or trailer deck and pivotable over an angular range of 90–360 degrees.

DETAILED DESCRIPTION OF BEST-MODE EMBODIMENTS OF THE INVENTION

The basic function of pilot-channel arrays is to facilitate placement, and transport of runner-supported vehicles or containers, especially snowmobiles fitted with wear-resistant cutter blades or wear rods on the skis. The essential purpose is to support the machine or goods on smooth, low-friction pilot channels which do not contact the ends/edges of the wear-resistant elements, thus avoiding "digging in" which would otherwise occur.

Figure 1:
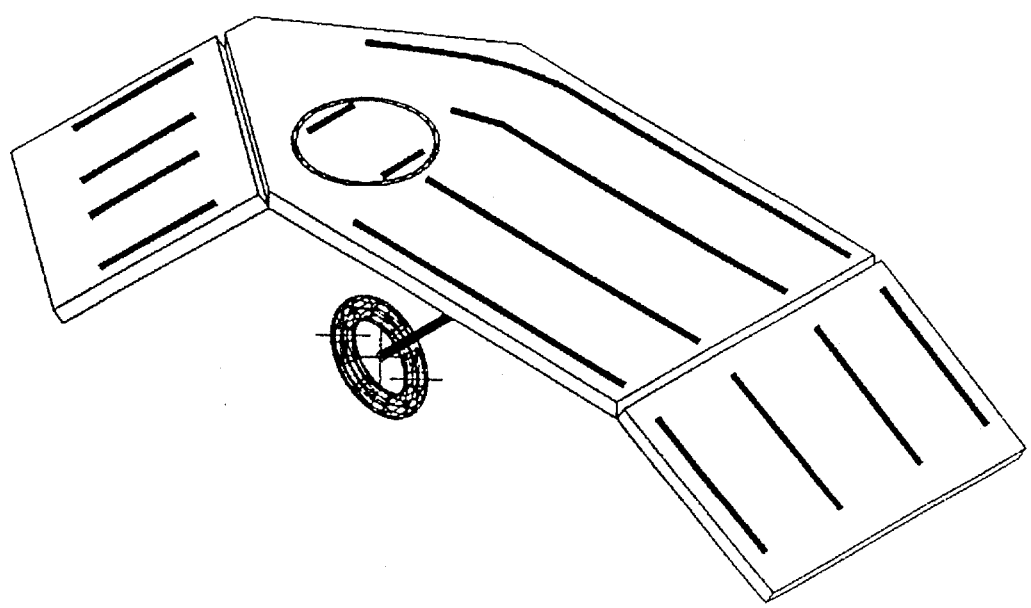
FIG. 1. Isometric view of typical snowmobile trailer with pilot channels fixed to deck and ramps.
Figure 2A:
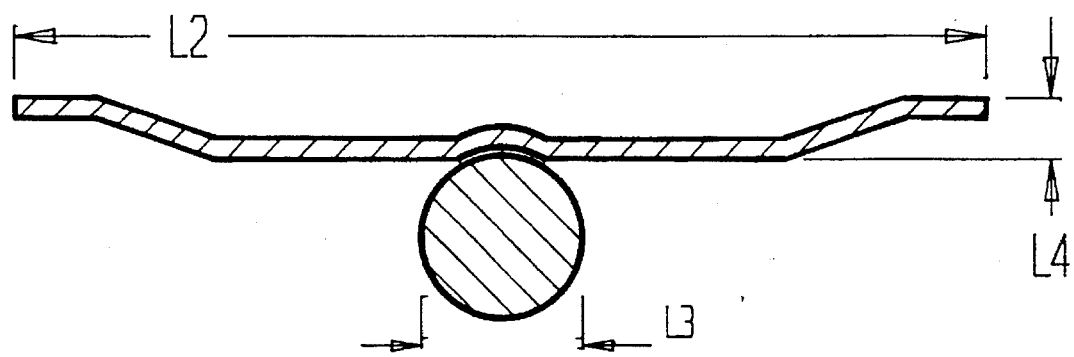
FIG. 2a–2b. Section views of typical runner or ski profiles showing silicon carbide blade elements.
Figure 2B:
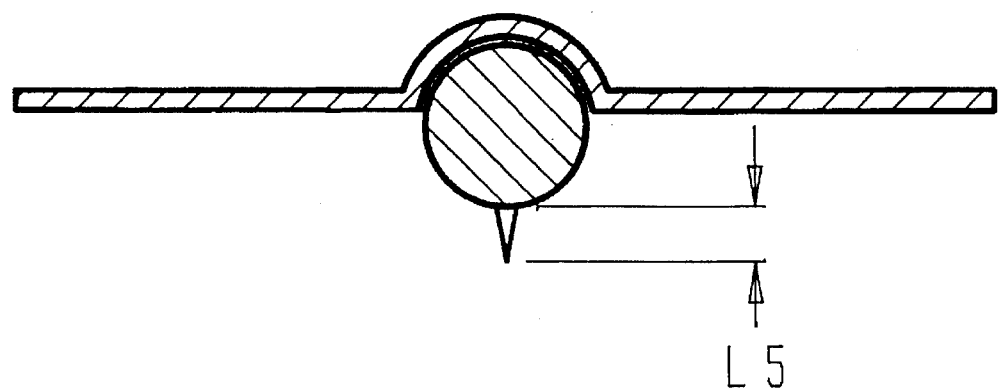
Figure 2C:
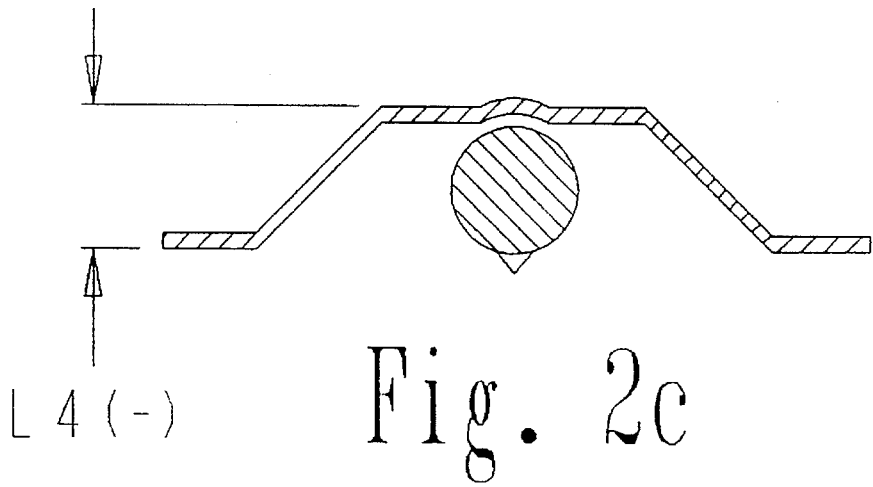
Figure 2D:
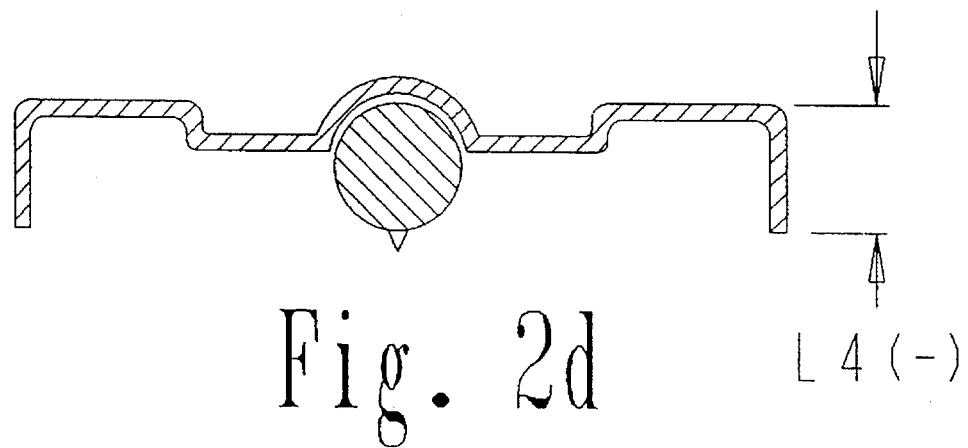
Figure 2E:
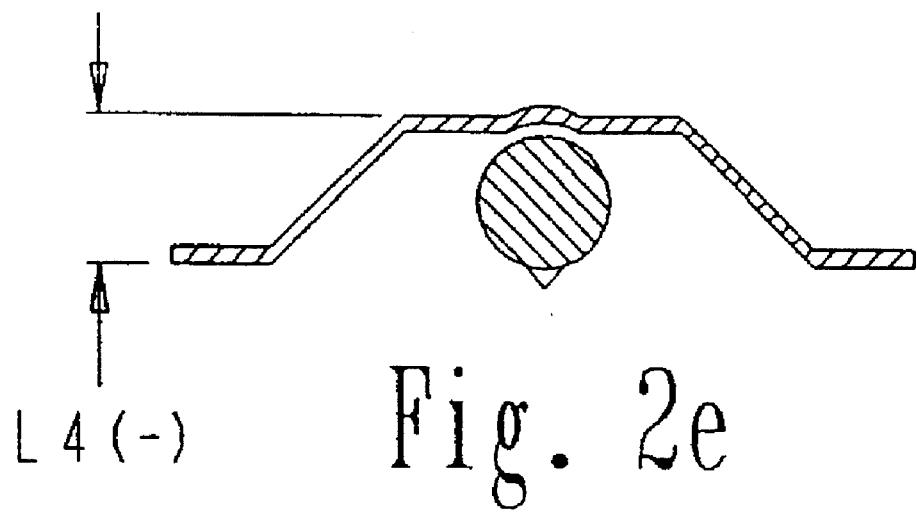
Figure 2F:
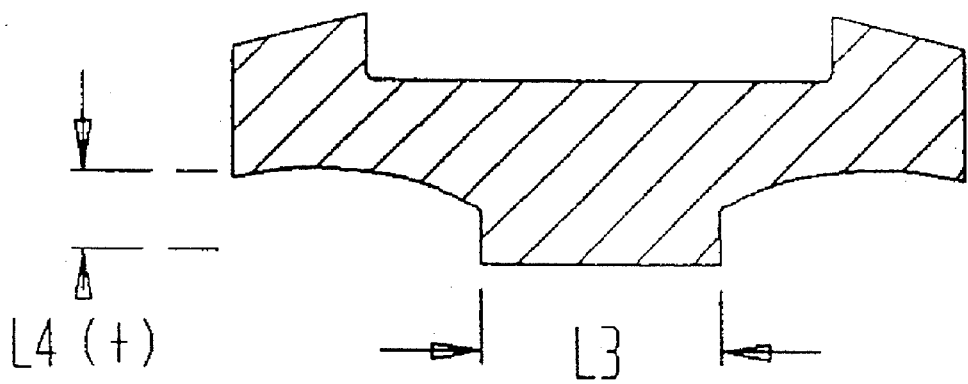

FIG. 1 illustrates a typical large, non-tilting snowmobile trailer with tandem axles and shows pilot channels fixed to the rear "on-ramp", the main deck, and the front "off ramp". In this illustration, individual pilot-channels are shown in a spaced-apart layout, i.e., separated by the nominal average track of the runners, which is designated as L1. For the sake of convenience in this specification, all parameters of the pilot channels and pilot-channel arrays will be scaled or normalized by the characteristic L1 dimension. For example, many snowmobiles have an average ski-centerline spacing or track of about 1100 mm; if this characteristic dimension is denoted as L1, and the width of a typical ski is about 100 mm, the L1-scaled width of the ski is thus 100/1100 or 0.091, which is a non-dimensional parameter.

As can be seen in FIG. 1, a portion of the length of the pilot channels are laid in an arc of radius about 2–20 times the separation of the runners; expressed in scaled terms, an arc of radius 2 to 20 L1. This illustrates a layout for guidance of the sled along the "on-ramp", to the transport position and finally to the "off-ramp". In order to accommodate short-radius curves, the following factors must also be considered: length of ski, form of ski, size/placement of the wear-resistant blade, shape/size of pilot-channel, and local spacing distance L1. These same parameters must be considered when fixing the length and angles between adjacent straight segments as illustrated by the angle shown between the channels of the front "off-ramp" and the channels on the main deck.

FIGS. 2a–2f illustrate a few alternative profile shapes for runners or skis. Of course, known standard runner shapes include vee-shapes, slabs, slats and numerous variants and combinations. The characteristic width of the ski is shown as L2, the characteristic size of the wear-resistant element is shown as L3, the characteristic depth of the recess in the ski working face is shown as L4, and the characteristic dimension of the cutting blade is shown as L5.

FIGS. 3a–3f illustrate several alternative pilot-channel profile shapes for supporting and guiding typical ski profiles as shown in FIG. 2a–2f. The pilot-channel working surfaces are denoted generally as WS; these surfaces engage the ski surfaces/edges and provide a groove or recess to accommodate a variety of sizes/ shapes of wear-resistant, runner-blade inserts. For a runnered vehicle, the outboard edges of the runners are those farthest from its longitudinal centerline; likewise the inboard edges are those which face toward the longitudinal centerline. These same concepts also apply to defining edge-specific pilot-channel zones, i.e., the top and bottom surfaces, relative to the baseplane, are referred to as the upper and lower facades, UF and LF; the inboard and outboard surfaces, relative to the runner centerline are referred to as inboard and outboard facades, IF and OF. Typically, the pilot-channel has two WS zones (1 inboard, 1 outboard). The working surface zones are further specified according to whether they engage the inboard or outboard edge of the runner. For this specification, the outboard working zone is denoted F1 and the inboard zone as F2. These zones may be assymetric from inboard to outboard; further, they may be planar, combinations of planes or complex curved surfaces. F3 is the connecting recess zone which lies between F1 and F2; F3 may be a complex curved plane or a combination of planes.

Figure 3A:
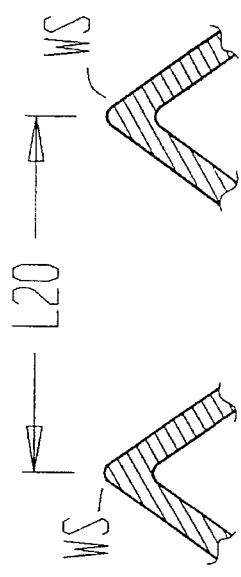
FIG. 3a–3f. Sectional views of typical pilot-channels showing complimentary form to runners and wear-resistant blade elements.

FIG. 3a shows another embodiment of this invention wherein one pilot channel is divided into two semichannels mounted at a spacing L20. In this example, each runner is supported by a pair of semi-channels. This alternative is of significant value when the pilot channel is being curved over an arc. Such semichannels can be attached to the baseplane with fasteners recessed into the WS zones.

Figure 3B:
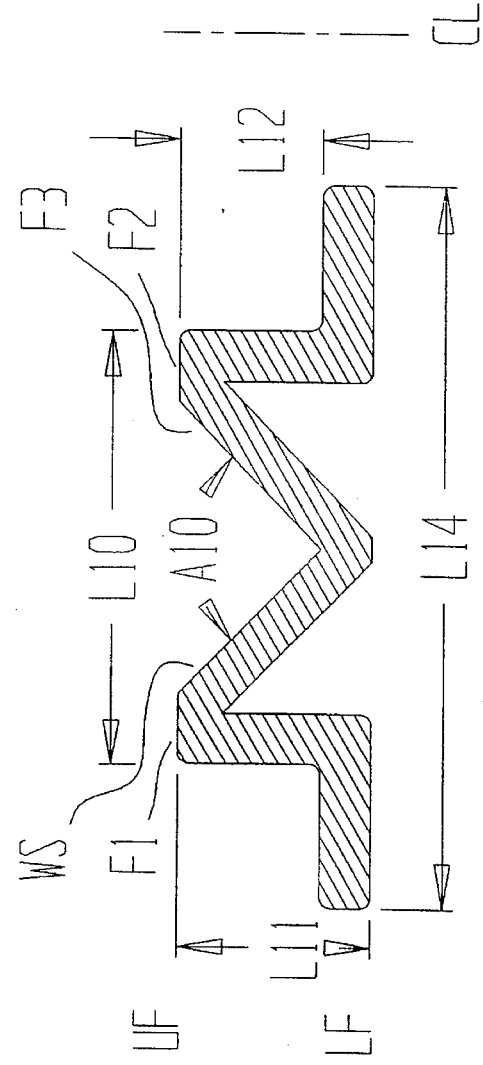

FIG. 3b shows another embodiment wherein an extruded pilot channel shape includes the mounting flanges, MF, the edge-specific working surfaces, F1, F2 and F3, the general working surface, WS, and a central recess defined by two planes with an included angle A10, which falls in the range 50–150 deg. In this example, L12 is the depth of the lowest point of the recess below the level of working surfaces, WS. This figure defines the general meaning of outboard working surface zone, F1, the inboard working surface zone, F2, and the connecting groove/recess zone F3.

Figure 3C:
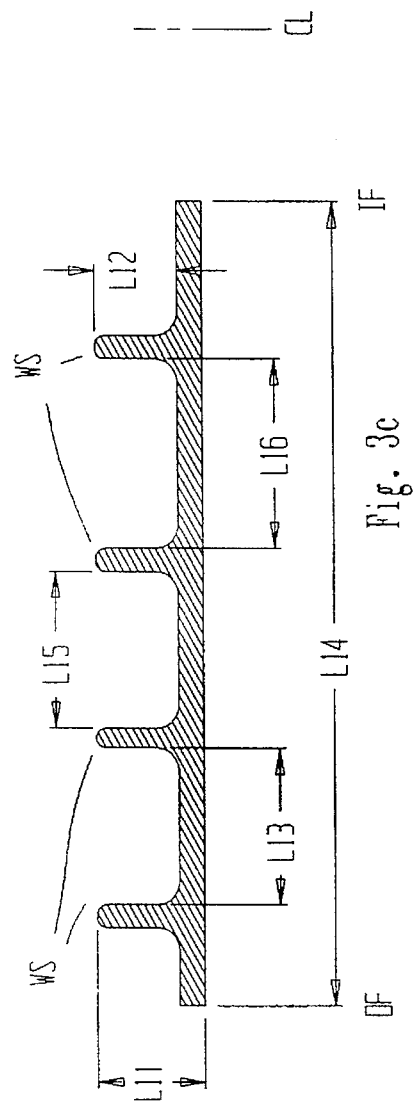

FIG. 3c shows another embodiment wherein the pilot channel consists of a set of 2–10 spaced parallel bars with defined spacing distances, L13, L14 and L16. In this case F3 surfaces are U-channels of specific width which form the walls of between the bars.

Figure 3D:
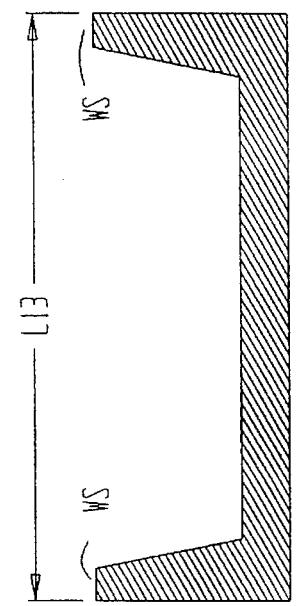

FIG. 3d shows a U-form pilot channel for thick-wall straight sections. This shape is particularly rigid and can be used over thin baseplane materials. The spacing between working surfaces, L13, is comparable to L10 and L20.

Figure 3E:
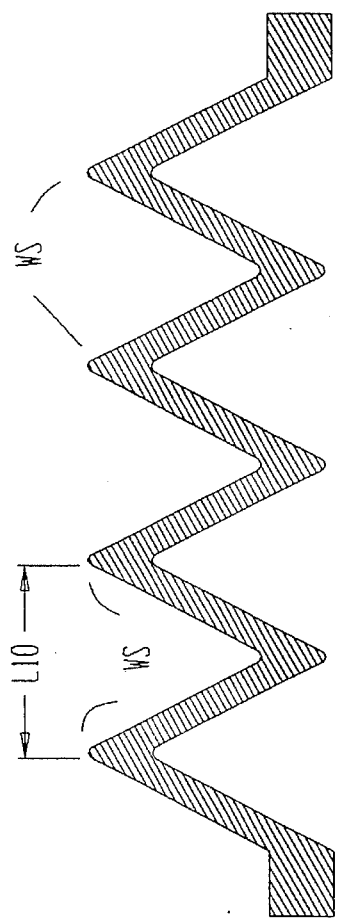

FIG. 3e shows a pilot channel with a set of spaced apart vee-grooves analogous to the example described in FIG. 3c above.

Figure 3F:
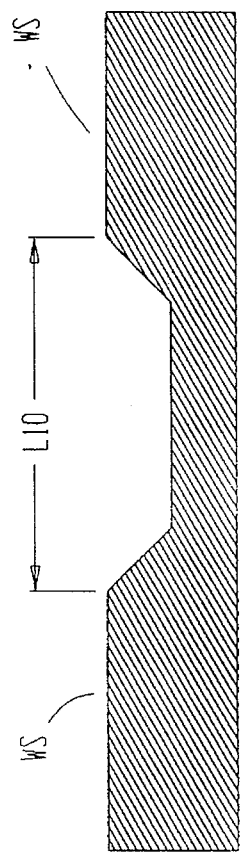

FIG. 3f shows a pilot channel with two broad working surfaces WS, separated by a groove. This type of pilot channel should be mounted with recessed fasteners or adhesive.

Other embodiments of the concepts of this invention include a trailer deck with one or more pairs of pilot channels formed integral. It is envisioned that the deck could be made in one or more wide sections, each including a pair of pilot channels; each section would accommodate one runnered vehicle or set of runnered containers/pallets. Another embodiment would be to form a pattern of pilot channels on a one-piece trailer deck. For these concepts the forms shown in FIG. 3c prepared with graded spacing patterns would be of significant value. Formed-integral pilot channel trailer-deck sections would be useful for movements of stacked containers in a route-delivery truck, such as a van for bakery products which are carried in molded plastic trays.

Table 1. presents a compact summary of definitions of each item of special nomenclature used to define pilot channels and pilot-channel arrays. Table 1 also presents dimensional data on runners and pilot channels including typical ranges of actual dimensions in millimeters and degrees and scaled by the track dimension, L1. The scaled values/ranges shown reflect a typical L1 value of 1100 mm.

Pilot-channels of this invention have been fabricated from a variety of polymer materials, plastic composites with filament reinforcement, plastic/metal laminations; loading trials under extremes of weather conditions have been used to validate the optimum materials, forms and fastening technics. One combination which has proved to be reliable is extruded polyolefin, using virgin or recycled pellets, in the general shape as shown in FIG. 3f fastened to conventional plywood trailer deck with self-tapping screws. This invention may be embodied in other specific forms without departing from the spirit or essential characteristics thereof.

TABLE 1

DIMENSIONAL PARAMETERS OF PILOT-CHANNELS

| Nomen-clature | Description | FIG. | Actual dimension mm or deg. min | Actual dimension mm or deg. max | L1-Scaled dims. non-dimensional min | L1-Scaled dims. non-dimensional max |
|---|---|---|---|---|---|---|
| | RUNNER PARAMETERS | | | | | |
| L1 | runner track and scaling basis | 1 | 300 | 1300 | 1.00 | 1.00 |
| L2 | width of ski | 2a1 | 90.00 | 145.00 | .081818 | .131818 |
| L3 | wear rod, char. dimension | 2a1 | 11.00 | 16.00 | .010000 | .014545 |
| L4 | depth of runner, (+) convex or (−) concave | 2a3 | −45.00 | 45.00 | −.040909 | .040909 |
| L5 | ht. of wear-resist. element | 2a5 | .05 | 25.00 | .000045 | .022727 |
| | PILOT-CHANNEL PARAMETERS | | | | | |
| WS | working surface length, pilot channel | 2b1 | 5.00 | 100.00 | .004545 | .090909 |
| F1 | working surface outboard zone extent | 2b2 | 3 | 60 | .002727 | .054545 |
| F2 | working surface inboard zone extent | 2b2 | 3 | 60 | .002727 | .054545 |
| F3 | connecting recess zone, betw. F1, F2 extent | 2b2 | .01 | 75 | .000009 | .068182 |
| MF | mounting flange extension, pilot channel | 2b1 | .01 | 55.00 | .000009 | .050000 |
| L10 | upper width of pilot-channel facades | 2b2 | 20.00 | 200.00 | .018182 | .181818 |
| L11 | total ht. of pilot channel betw. facades | 2b2 | 5.00 | 100.00 | .004545 | .090909 |
| L12 | depth of pilot channel, below WS | 2b2 | 1.00 | 75.00 | .000909 | .068182 |
| L13 | bar spacing1, parallel WS surfaces | 2b3 | 12.00 | 150.00 | .010909 | .136364 |
| L14 | total lower width of pilot channel | 2b2 | 40.00 | 300.00 | .036364 | .272727 |
| L15 | bar spacing2, parallel WS surfaces | 2b3 | 12.00 | 150.00 | .010909 | .136364 |
| L16 | bar spacing3, parallel WS surfaces | 2b3 | 12.00 | 150.00 | .010909 | .136364 |
| A10 | recess included angle | 2b2 | 50.00 | 150.00 | | |
| L20 | width of separated semi-channels | 2b1 | 50.00 | 100.00 | .045455 | .090909 |

We claim:

1. An apparatus for accommodating powered track-driven vehicles or containers each of which includes a pair of parallel elongated runners for steering the vehicle or container, comprising:

a vehicle platform for supporting said vehicles or containers, a pair of parallel pilot channels fixed to the vehicle platform for directly supporting said pair of parallel elongated runners and for preventing said runners from directly contacting said vehicle platform, said pair of pilot channels being spaced from each other by an average spacing distance corresponding to the lateral spacing distance of said pair of elongated runners, each said pilot channel including a pair of lower, horizontal mounting flange portions (MF) for directly contacting and supporting said channel on said platform, a pair of vertical portions extending from the mounting-flange portions, a pair of upper horizontal portions (F1, F2) extending inwardly from said vertical portions and having upper working surfaces for directly supporting and guiding said elongated runners, and a pair of sloped portions forming a recess zone (F3) and extending downwardly from said upper horizontal portions, said sloped portions being joined together along the longitudinal axis of said pilot channel.

2. Apparatus of claim 1 wherein each of said pilot channels consists of polyolefin material.

3. Apparatus of claim 1 wherein each of said pilot channels consists of an integral M-shaped section of polyolefin, and having a wall thickness in the range of 4–6 mm for all portions including said mounting flanges;

a spacing between said upper horizontal portions (F1) and (F2) plus a thickness of each of said horizontal portions (F1) and (F2) is in the range of 50–90 mm;

a depth of said recess zone (F3) is in the range of 10–30 mm; and said lateral spacing of said parallel runners is in the range of 900–1300 mm.

4. Apparatus for transporting snowmobiles, each of which includes a pair of elongated parallel steering runners with wear-resistant elements, comprising:

vehicle platform for supporting snowmobiles during transport, a pair of parallel pilot channels fixed to said vehicle platform for directly supporting said pair of parallel elongated runners with said wear-resistant elements and for preventing said runners and said wear-resistant elements from directly contacting said vehicle platform, said pair of pilot channels being spaced from each other by an average spacing distance corresponding to the lateral spacing distance of said pair of elongated runners, each said pilot channel including a pair of lower, horizontal mounting flange portions (MF) for directly contacting and supporting said channel on said platform, a pair of vertical portions extending from the mounting-flange portions, a pair of upper horizontal portions (F1) (F2) extending inwardly from said vertical portions and having upper working surfaces for directly supporting and guiding said elongated runners, and a pair of sloped portions forming a recess zone (F3) for accommodating said wear-resistant elements and extending downwardly from said upper horizontal portions, said sloped portions being joined together along the longitudinal axis of said pilot channel.

5. Apparatus of claim 4 wherein each of said pilot channels consists of an integral M-shaped section of polyolefin, and having a wall thickness in the range of 4–6 mm for all portions including said mounting flanges;

a spacing between said upper horizontal portions (F1) and (F2) plus a thickness of each of said horizontal portions (F1) and (F2) is in the range of 50–90 mm;

a depth of said recess zone (F3) is in the range of 10–30 mm; and said lateral spacing of said parallel runners is in the range of 900–1300 mm.

* * * * *